United States Patent
Nabeiro et al.

(10) Patent No.: US 11,701,992 B2
(45) Date of Patent: Jul. 18, 2023

(54) SEMIAUTONOMOUS APPARATUS AND SYSTEM OF DISTRIBUTION OF EDIBLE PRODUCTS INCLUDING SAID SEMIAUTONOMOUS APPARATUS

(71) Applicant: NOVADELTA—COMÉRCIO E INDÚSTRIA DE CAFÉS, LDA, Lisbon (PT)

(72) Inventors: Rui Miguel Nabeiro, Campo Maior (PT); Jesús Medina Mundt, Lisbon (PT); José Miguel De Jesus Estima, Lisbon (PT); Tiago Rafael Da Silva Ferrolho Mendes, Lisbon (PT)

(73) Assignee: NOVADELTA—COMÉRCIO E INDÚSTRIA DE CAFÉS, LDA, Lisbon (PT)

( * ) Notice: Subject to any disclaimer, the term of this patent is extended or adjusted under 35 U.S.C. 154(b) by 516 days.

(21) Appl. No.: 16/646,425

(22) PCT Filed: Sep. 13, 2018

(86) PCT No.: PCT/PT2018/050033
§ 371 (c)(1),
(2) Date: Mar. 11, 2020

(87) PCT Pub. No.: WO2019/054889
PCT Pub. Date: Mar. 21, 2019

(65) Prior Publication Data
US 2020/0269743 A1    Aug. 27, 2020

(30) Foreign Application Priority Data

Sep. 14, 2017 (PT) .......................................... 110287

(51) Int. Cl.
*B60P 3/025* (2006.01)

(52) U.S. Cl.
CPC .................................. *B60P 3/0257* (2013.01)

(58) Field of Classification Search
CPC ...................................................... B60P 3/0257
See application file for complete search history.

(56) References Cited

U.S. PATENT DOCUMENTS 10,328,769 B2 *   6/2019   Ferguson ............ G07C 9/00563
2002/0165638 A1  11/2002   Bancroft et al.
(Continued)

FOREIGN PATENT DOCUMENTS

CN   107577228 A   *  1/2018   ............ B60P 3/0257
EP   1 946 684 B1      2/2012
(Continued)

OTHER PUBLICATIONS

Google Machine translation of EP1946684B1 (Jan. 19, 2007).*

(Continued)

*Primary Examiner* — Jean Paul Cass
(74) *Attorney, Agent, or Firm* — Sughrue Mion, PLLC

(57) ABSTRACT

A semiautonomous apparatus (1) for preparation and distribution of edible products, e.g. beverages, having a subsystem of preparation of edible products based upon portions (2) of edible substances, for example capsule of ground coffee beans for preparing expresso coffee, and comprising at least one brewing device (4), and a subsystem of propulsion and locomotion comprising propulsion and locomotion means (5). The apparatus (1) comprises a casing (3) with a generally parallelepiped, cylindrical shape, or other, that configures a top area that develops at all width and all length at the highest level of said casing (3). The top area comprises a plurality of service regions (31, 32) distributed in coherent manner in the top area of said casing (3). The first service region (31) presents first and second openings (11, 12) for (Continued)

introduction of portions (2) and for discharging beverage in a direction opposite to the gravity force.

19 Claims, 4 Drawing Sheets

(56) References Cited

U.S. PATENT DOCUMENTS

| | | | | |
|---|---|---|---|---|
| 2017/0011580 A1* | 1/2017 | Huang | ............ | G06Q 20/20 |
| 2017/0174343 A1* | 6/2017 | Erickson | ............ | B64C 39/024 |
| 2018/0321679 A1* | 11/2018 | Nixon | ............ | G08G 1/202 |
| 2019/0033868 A1* | 1/2019 | Ferguson | ............ | G06Q 10/08 |
| 2019/0034858 A1* | 1/2019 | Ferguson | ............ | G06Q 10/00 |
| 2019/0035044 A1* | 1/2019 | Ferguson | ............ | G05D 1/0295 |
| 2019/0056751 A1* | 2/2019 | Ferguson | ............ | G05D 1/0214 |
| 2020/0070717 A1* | 3/2020 | Garden | ............ | G06V 10/751 |

FOREIGN PATENT DOCUMENTS

| | | | | |
|---|---|---|---|---|
| EP | 1946684 B1 * | 2/2012 | ............ | A47J 31/407 |
| EP | 3 037 907 A1 | 6/2016 | | |
| EP | 3037907 A1 * | 6/2016 | ............ | G05D 1/0044 |
| WO | 2014/121838 A1 | 8/2014 | | |
| WO | WO-2018236668 A1 * | 12/2018 | ............ | B60P 3/0257 |
| WO | WO-2020081883 A1 * | 4/2020 | ............ | A47J 44/00 |

OTHER PUBLICATIONS

International Search Report for PCT/PT2018/050033 dated Jan. 21, 2019 [PCT/ISA/210].

Written Opinion for PCT/PT2018/050033 dated Jan. 21, 2019 [PCT/ISA/237].

\* cited by examiner

SEMIAUTONOMOUS APPARATUS AND SYSTEM OF DISTRIBUTION OF EDIBLE PRODUCTS INCLUDING SAID SEMIAUTONOMOUS APPARATUS

CROSS REFERENCE TO RELATED APPLICATIONS

This application is a National Stage of International Application No. PCT/PT2018/050033, filed on Sep. 13, 2018, which claims priority from Portuguese Patent Application No. 110287, filed on Sep. 14, 2017, the entire contents of each of which are herein incorporated by reference in their entireties.

FIELD OF THE INVENTION

The present invention refers to the field of semiautonomous systems comprising own locomotion means, for preparing edible products, in particular beverages, and distribution of other food products.

There are known systems of distribution of edible products, notably beverages, by means of apparatuses adapted for processing portions, in particular in the form of capsules comprising a precursor edible substance. Said systems comprise fluid pressurization means, optionally also fluid heating means, and portion collection devices so as to inject a pressurized flow and to collect a beverage downstream of said portion.

Moreover, the prior art includes several solutions relating to mobile devices adapted for distribution of edible products. Documents WO 2008/063403 A2 and EP 2868243 A1 disclose trolleys for distribution of food and beverages. Said trolleys require exterior locomotion power, in particular being pushed by users thereof.

There are further known solutions of autonomous systems for distribution of edible products.

Documents EP 1946684 B1 and WO 2015/120384 A1 discloses autonomous machines for distribution of food and beverages that include self-propulsion and locomotion means.

In case of document EP 1946684 B1 there is disclosed an autonomous mobile robotic device that comprises a coffee machine integrated in autonomous manner and that operates automatically without requiring any external influence, with exception of a beverage request by a consumer.

In case of document WO 2015/120384 A1, the system comprises at least one self-propelled apparatus and a set of sensors operatively related with the control system of apparatus and for interacting with a user. In particular, said control is configured so that can position a self-propelled apparatus at a given geographic position within a geographic limit boundary, observing by means of a set of sensors at least one consumer within the autonomy range of the apparatus, moving towards the location of user where an interaction between the apparatus and the consumer is facilitated.

However, none of the documents in the prior art discloses a solution that improves the conditions of ergonomic use with relation to the self-propelled displacement movement and cycles of preparation of edible products based upon single portions.

Moreover, there is a need for providing a favourable operation manner of this type of autonomous systems for distribution of edible products, in particular with casual intervention by the users both in the displacement process and in the process of preparation of edible product. That is, for example, without resource to systems for automatically loading capsules into beverage brewing devices.

General Description of the Invention

The objective of the present invention is to provide a semiautonomous apparatus for preparation and distribution of edible products, in particular beverages, comprising a product preparation device, for example a device adapted for brewing coffee and other aromatic beverages, adapted for collecting a portion of edible substance, for example provided in a capsule or similar, and presenting a simpler and more ergonomic general configuration.

The aforementioned objective is attained according to the present invention by means of an apparatus according to claim 1.

In particular, the semiautonomous apparatus according to the present invention comprises a casing presenting a plurality of service regions distributed in coherent manner on the top region, whereby said service regions include:
  a first service region adapted for preparing a beverage and that presents at least one first opening configured so that provides the introduction of said portion and supply thereof to said brewing device, and at least one second opening configured for beverage discharge along a vertical upwards direction, through the base region of and into a beverage recipient,
  a second service region adapted for support of said use interface.

Said service regions can be provided adjacent and so that define a continuous surface, preferentially without presenting any projections above of said continuous surface.

It is preferred when the semiautonomous apparatus according to the present invention presents first and second service regions that develop at the highest plane of said semiautonomous apparatus, so that the actions of preparation of edible product by a user preferentially unfold at a same level of said semiautonomous apparatus.

It is preferred when said casing confines a fluid supply disposition provided flow upstream with relation to said brewing device, whereby said fluid supply disposition comprises at least one of: a fluid heating device, for example of thermoblock, boiler type, and a fluid pressurization device, for example of pump type.

It is preferred when at least one of said first and second service regions develops along at least one of:
  a substantially horizontal plane and
  an oblique plane presenting an inclination smaller than 45° relative to the horizontal.

It is preferred when said first and second service regions develop along a parallel plane, preferentially along a substantially common plane, or at an angle that does exceed 45°, preferentially does not exceed 30°.

It is preferred when at least one of said first and second service regions develops in a top region at least in the proximity of a first edge of said casing.

It is preferred when the vertical projection of said first and second service region develops above a container for collecting used portions and, preferentially at least partially above a fluid supply container, whereby both said containers are provided so that can be removed and placed through a lateral face of said casing.

It is preferred when said casing further presents a third service region adapted for storage of other edible products, whereby said third service region is provided with a physical separation from said first and second service regions, preferentially a physical separation that reduces the heat transfer to said third service region.

It is preferred when said third service region develops on a second edge of casing opposite to that of said first and second service regions.

The semiautonomous apparatus according to the present invention includes a control device provided so that the operation of said brewing device and of said propulsion and locomotion means is mutually exclusive, so that said semiautonomous apparatus cannot provided edible products while being moved by said propulsion and locomotion means.

It is preferred when said control device is provided so that the start of operation of said brewing device requires an actuation external to said semiautonomous apparatus and a confirmation of the state of immobilization of said semiautonomous apparatus.

It is preferred when said control device is provided so that a start of operation of said brewing device and of said propulsion and locomotion means requires the actuation by a user of a respective start command with said use interface, and said control device is provided so that a confirmation of state of immobilization of the semiautonomous apparatus requires the actuation by a user of a respective stop command of said propulsion and locomotion means through said use interface.

It is preferred when said control device is provided in data connection with surroundings recognition means preferentially provided in at least one of: on a lateral face and on the top face of said casing, whereby said surroundings recognition means present an optical recognition disposition, preferentially a digital camera, oriented in at least one observation direction so that can optically recognize at least one of: a surrounding space and a user, preferentially previously defined, and provide respective recognition data to said control device.

It is preferred when said control device is provided so that controls the circulation of said autonomous propulsion and locomotion means based upon data obtained by said surroundings recognition means from at least one of:
 physical elements, including physiognomic or similar aspects, characteristic of a previously defined user, and
 previously defined spatial elements of the surroundings.

It is preferred when said control device is provided so that can control the circulation of said autonomous propulsion and locomotion means in at least one of:
 along an operation path (A) with a previously defined trajectory, preferentially in closed circuit,
 along any paths with non previously defined trajectories within a previously defined operation space (B),
whereby it is preferred when there is provided a base station on said operation path (A) and/or operation space (B), or in the proximity thereof.

It is preferred when said control device is provided so that said autonomous propulsion and locomotion means can move the semiautonomous apparatus in case there is at least one of:
 request of edible product by a consumer received by wireless communication means, and
 recognition of a previously defined user, preferentially by means of facial recognition, by said surroundings recognitions means.

It is preferred when said control device is adapted so that can automatically recognize at least one of:
 portions of edible substance used in the preparation of an edible product,
 previously authorized users by means of information provided to said use interface, preferentially by means of at least one of facial and voice recognition;
 requests received by means of wireless remote communication means, preferentially near-field communications, with a communications apparatus previously associated with a consumer.

It is preferred when said use interface includes actuation means for control of said brewing device and of said autonomous propulsion and locomotion means, and said use interface is provided so that the respective exterior surface results as a surface that is continuous with the adjacent surface of said casing, for example as a digital touch screen.

It is preferred when said control device is adapted so that can exchange data by means of at least one of: a short-range communications device, such as for example of Bluetooth type, or similar, and a long-range communications device, of 3G, 4G type, or similar.

Another objective of the present invention is to provide a system of preparation and distribution of edible products including at least one semiautonomous apparatus and at least one type of portion of the type of the present invention.

The aforementioned objective is attained according to the present invention by means of a system according to claim 13.

DESCRIPTION OF THE FIGURES

The present invention shall now be explained in greater detail based upon preferred embodiments and upon the attached figures.

The Figures show, in schematic representations.

DESCRIPTION OF PREFERRED EMBODIMENTS OF THE INVENTION

Figure 1:
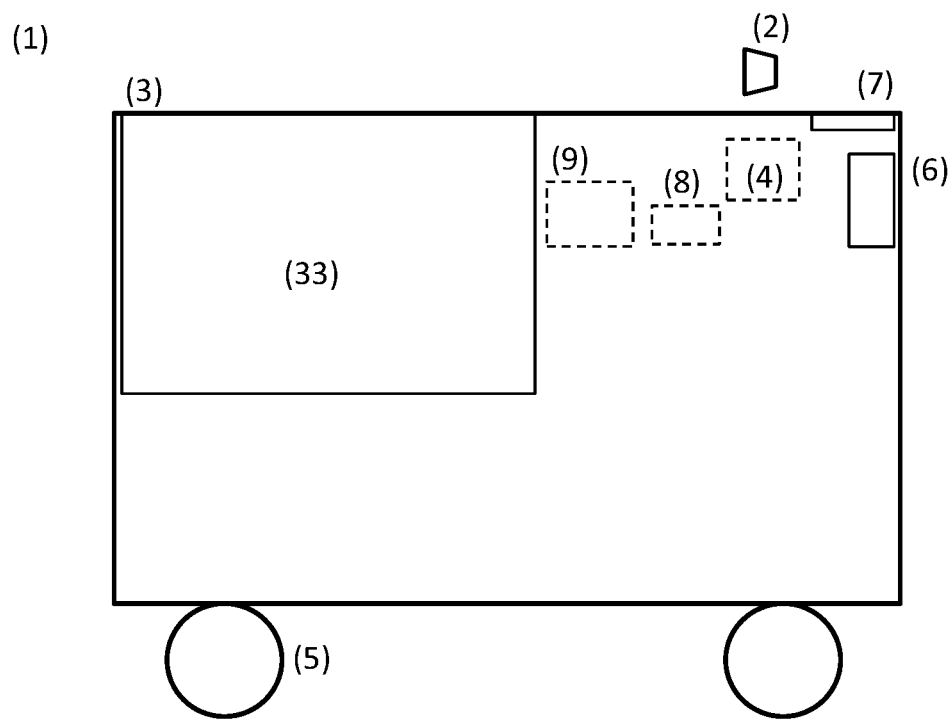
FIG. 1: side view of a first embodiment of an apparatus (1) according to the present invention.
Figure 2:
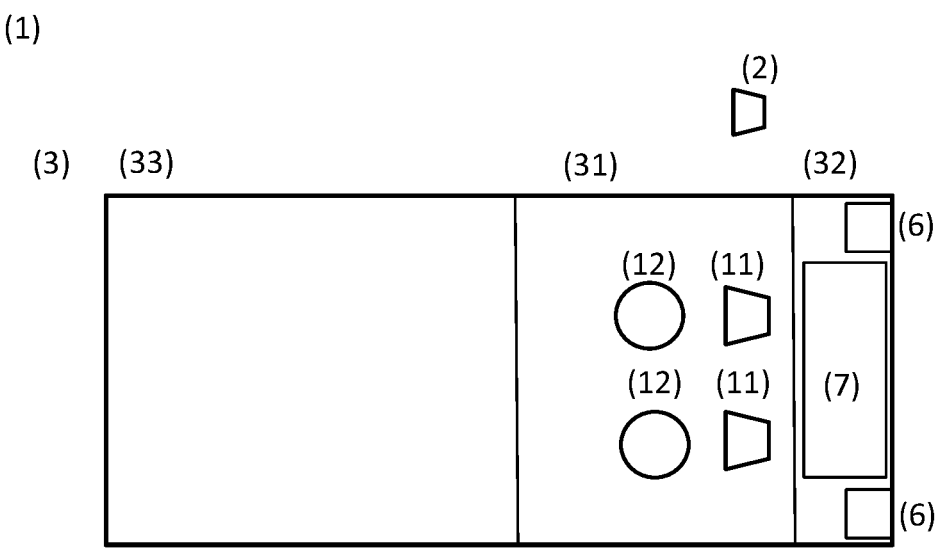
FIG. 2: top view of the apparatus (1) according to FIG. 1.

A semiautonomous apparatus (1) according to the present invention basically comprises, in the case of a first embodiment (see FIGS. 1 and 2), a subsystem for preparation of edible products and a subsystem for autonomous propulsion and locomotion, whereby the operation of both of said subsystems is controlled by a control device (8), or by respective control devices (8) in operative connection with each other.

A casing (3) presents a general parallelepiped-like form that confines inside thereof at least one brewing device (4) adapted so that can collect a portion (2) of edible substance. Besides of said brewing device (4), the subsystem for preparation of edible products further comprises fluid heating and pressurization means (9) that supply a pressurized flow to said brewing device (4).

Moreover, said semiautonomous apparatus (1) presents autonomous propulsion and locomotion means (5), surroundings recognition means (6) and use interface means (7) provided in operational connection with a control device (8).

According to an inventive aspect, said control device (8) is provided so that the operation of said brewing device (4) and of said propulsion and locomotion means (5) is mutually exclusive, so that said apparatus (1) cannot provide edible products while being moved by respective propulsion and locomotion means (5).

Moreover, it is preferred when said control device (8) is provided so that the start of operation of at least one of said pressurized flow circulation means and said brewing device (4), requires an input external to said semiautonomous apparatus (1) and a confirmation of the state of immobilization of said semiautonomous apparatus (1).

It is preferred when said control device (8) is provided so that a start of operation of at least one of said pressurized flow circulation means and brewing device (4), and of said propulsion and locomotion means (5), requires the actuation by a user of a respective start command by means of said use interface (7).

It is preferred when said semiautonomous apparatus (1) further comprises surroundings recognition means (6) provided in data connection with a control device (8), whereby said surroundings recognition means (6) present an optical recognition disposition, preferentially a digital camera, oriented along at least one observation direction so that can optically recognize at least one of: a surrounding space and a user, preferentially previously defined, and provide respective recognition data to said control device (8).

It is further preferred when said control device (8) is configured so that said autonomous propulsion locomotion means (5) can move the semiautonomous apparatus (1) if there is at least one of:

request of edible product by a consumer received through wireless communication means, and recognition of a previously defined user, preferentially by means of facial recognition, by means of said surroundings recognition means (6).

According to a preferred embodiment, said propulsion and locomotion means (5; 51, 52) comprise at least one of:

two drive wheels adapted so as to propel locomotion to at least another wheel, preferentially to two other wheels;

at least one and up to four omnidirectional wheels, so that the apparatus can turn on itself on the same location and can reverse the displacement direction or change the displacement direction, without needing to make curve.

According to another inventive aspect (see FIG. 2), said casing (3) presents a first and second service regions (31, 32) on its top region, whereby said first service region (31) presents a first opening (11) configured so that provides the introduction of said portion (2), as well as a second opening (12) adapted so that provides discharge of resulting edible product. Said first and second openings (11, 12) are preferentially provided on a continuous plane, preferentially devoid of cavities and projection, that extends along at least most part, preferentially the totality of said top region.

Said second service region (32) develops in the vicinity of said first region (31), preferentially in the front region of said casing (3), and presents at least one use interface (7), preferentially provided as a tactile interactive screen and including at least the control commands of the subsystem of preparation of edible products, including a "start" command.

It is preferred when said second service region (32) further presents surroundings recognition means (6) provided as optical means adapted for image recognition (6), whereby at least two of said surroundings recognition means are preferentially provided in side regions of said second service region (32).

It is preferred when said first and second service regions (31, 32) develop along a parallel plane, preferentially along a substantially common plane, or at an angle that does not exceed 45°, preferentially does not exceed 30°.

Said casing (3) can further present a third service region (33) adapted for storage of other edible products, preferentially with supply connection to said product preparation device (4), whereby said third service region (33) is provided with a physical separation from said first and second service regions (31, 32), preferentially a physical separation adapted so that reduces the heat transfer to said third service region (33).

It is preferred when said third service region (33) develops on a second portion of casing (3) in-between and in the vicinity of said first and second service regions (31, 32), so that results an easier use of the semiautonomous apparatus (1).

Figure 3:
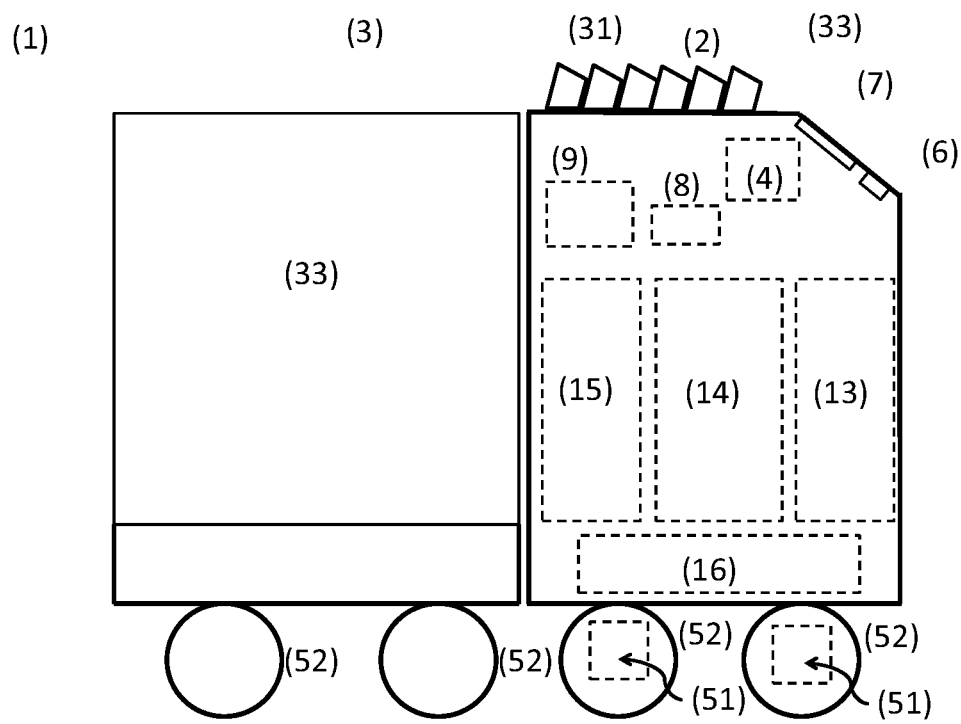
FIG. 3: side view of a second embodiment of an apparatus (1) according to the present invention.
Figure 4:
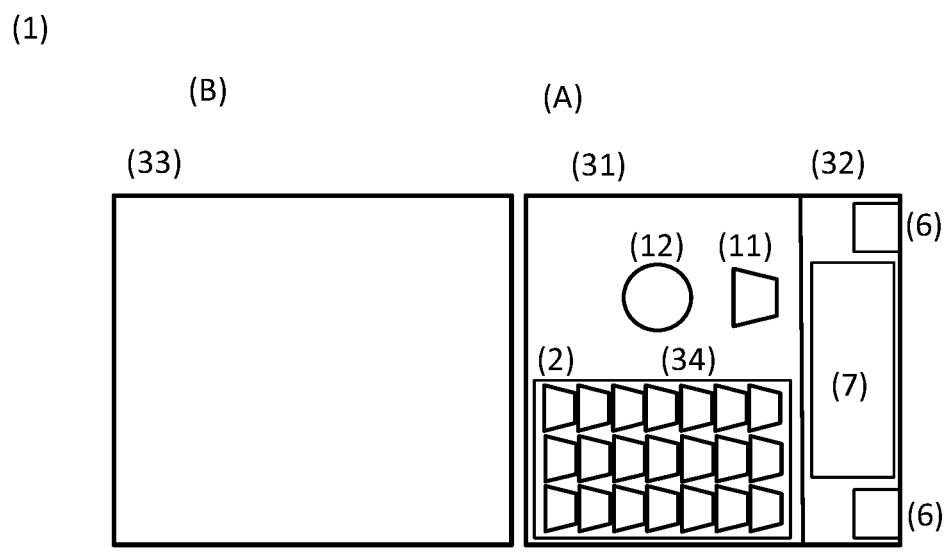
FIG. 4: top view of the apparatus (1) according to FIG. 3.

FIGS. 3 and 4 represent a second preferred embodiment of semiautonomous apparatus (1) according to the present invention.

As represented, said casing (3) in this case comprises a first module that presents said first and second service regions (31, 32) and a second module separated but physically connected with said first module, and that presents said third service region.

Moreover, said first module of casing (3) in this case confines all the elements relating to the subsystem of preparation of edible products based upon single portions (2) of edible substance, for example provided in capsules, as well as a first and second energy storage devices (14, 16).

Said propulsion and locomotion means (5) comprise propulsion device (51), preferentially electric motors, and locomotion elements (52), preferentially wheels, whereby at least part of said locomotion elements (52) is directly associated to a respective propulsion device (51).

Said autonomous propulsion and locomotion means (5; 51, 52) are adapted so that can be supplied with energy from energy storage means (14, 16), whereby said energy storage means (14, 16) are provided physically separated, preferentially in liquid-tight manner, from said subsystem of preparation of edible products, and in at least one of: in-between and at a lower level than said collection container (13) for used portions and fluid supply container (15).

It is preferred when said energy storage means (14, 16) are provided so that can be accessed through a lateral region of said casing (3), preferentially by means of a door-like element, or similar, provided on said casing (3).

As previously referred, the semiautonomous apparatus (1) according to the present invention can present a casing (3) that comprises a first module of casing (3) provided physically separated from, and physically connectable to, a second module of casing (3), whereby said first and second modules of casing (3) present a similar general configuration, preferentially of parallelepiped type, and whereby said first and second service regions (31, 32) are provided on said first module of casing (3), and said third service region (33) is provided on said second module of casing (3).

Said casing (3) can comprise a first module of casing (3) that presents all autonomous propulsion means (51), whereby said first and second modules of casing (3) present respective locomotion means (52).

Said casing (3) can comprise a first module of casing (3) that presents all said energy storage means (14, 16), said fluid supply disposition (9) and said brewing device (4).

It is preferred when said first and second energy storage means (14, 16) are provided in a physically separated compartment that develops underneath and contained within the vertical projection of said first and second service regions (31, 32).

According to a preferred embodiment, said product discharge (12) is provided on said first service region (31), and adapted so that can discharge a product flow along a generally vertical upwards direction, whereby it is preferred when said product discharge (12) provided a cavity adapted for actionable retention of a beverage recipient, preferentially a beverage recipient with a configuration adapted so that can be retained on said product discharge (12).

It is further preferred when said fluid supply disposition (9) is arranged at a lower level with relation to said service regions (31, 32) and above said autonomous propulsion and locomotion means (5; 51, 52).

The semiautonomous apparatus according to the present invention includes a casing (3), said casing (3) further confines a fluid supply disposition (9) provided flow upstream with relation to said brewing device (4), whereby said fluid supply disposition (9) comprises at least one of: a fluid heating device, for example of thermobloc type, boiler, and a fluid pressurization device, for example of the pump type.

Said casing (3) can present a generally parallelepiped, cylindrical shape, or other, configuring a top area that extends at all width and all length at the highest level of said casing (3), said top area comprising a plurality of service regions (31, 32) distributed in coherent manner in the top area of said casing (3).

Said service regions (31, 32) can include a first service region (31) adapted for preparing a beverage and that presents at least one first opening (11) configured so that provided the introduction of said portion (2) and supply thereof to said brewing device (4), and at least a second opening (12) configured for beverage discharge along a vertical upwards direction, through a base region and inside of a beverage recipient, and a second service region (32) adapted for support of said use interface (7), whereby said service regions (31, 32) are provided adjacent and so that define a continuous surface, preferentially without presenting projections.

It is preferred when at least one of, preferentially both of, said first and second service regions (31, 32) develop in the highest plane of said semiautonomous apparatus (1).

It is preferred when at least one of said first and second service regions (31, 32) develop along at least one of: a substantially horizontal plane and an oblique plane presenting an inclination smaller than 45° relative to the horizontal.

Moreover, said first and second service regions (31, 32) can develop along a parallel plane, preferentially along a substantially common plane, or at an angle that does not exceed 45°, preferentially that does not exceed 30°.

It is preferred when at least one of said first and second service regions (31, 32) develops on a top region at least in the proximity of a first edge of said casing (3).

It is further preferred when the vertical projection of said first and second service regions (31, 32) develops above a collection compartment (13) for used portions and, preferentially at least partially above of a fluid supply container (15), whereby both of said containers (13, 15) are provided so that can be removed and placed from a lateral face of said casing (3).

Said casing (3) can further present a third service region (33) adapted for storage of other edible products, whereby said third service region (33) is provided with a physical separation from said first and second service regions (31, 32), preferentially a physical separation that reduces the heat transfer to said third service region (33).

It is preferred when said third service region (33) develops on an region of said casing (3) opposite to that of said first and second service regions (31, 32).

It is preferred when said second (32), first (31) and third (33) service regions develop successively along the longitudinal extension of the top region of said casing (3).

It is preferred when said casing (3) further presents a fourth service region (34) adapted for storage of said portions (2), whereby said fourth service region (34) is provided as at least one of: as a region on the top surface of said casing (3) and as an interior space, with lateral or frontal access through said casing (3).

Figure 5:
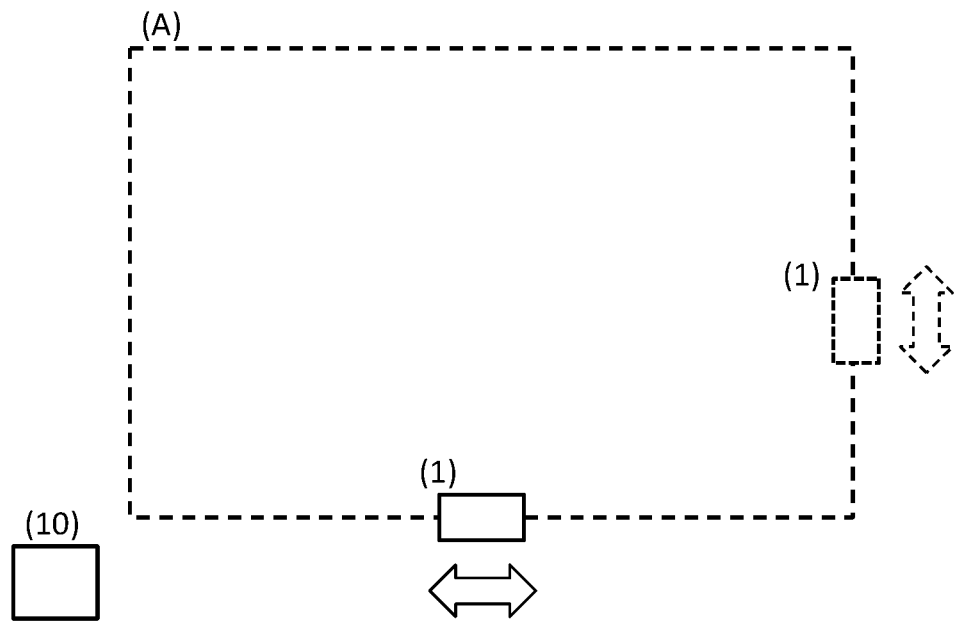
FIG. 5: top view of a first operation space for an apparatus (1) according to the present invention.
Figure 6:
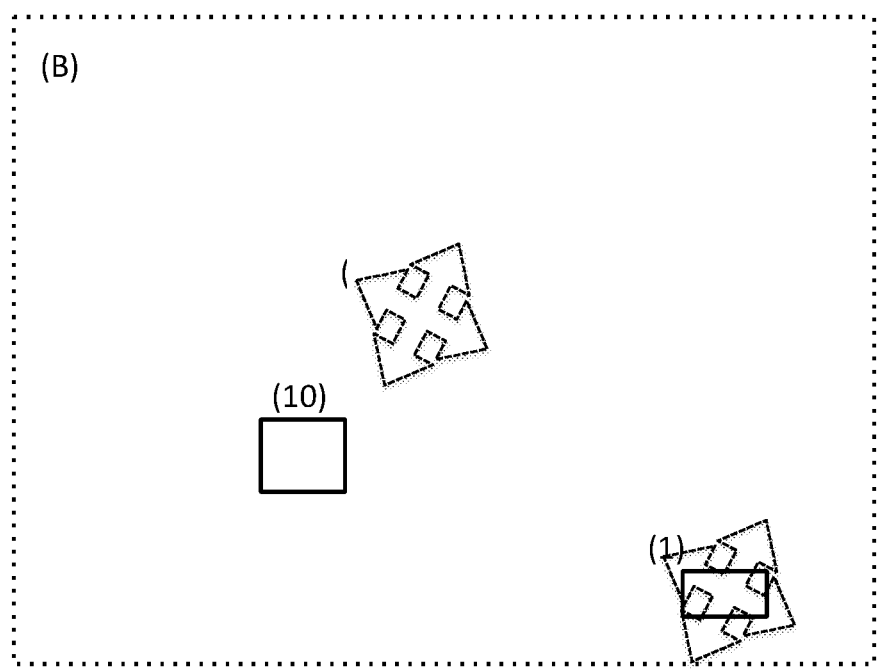
FIG. 6: top view of a second operation space for an apparatus (1) according to the present invention.

According to another inventive aspect, schematically represented in FIGS. 5 and 6, said control device (8) is provided so that can register product requests without requiring the actuation of a stop command of said propulsion and locomotion means through said use interface (7). Moreover, said control device (8) is further provided so that the semiautonomous apparatus (1) moves in at least one of:
  with a previously defined trajectory along an operation path (A), preferentially in closed circuit,
  within a previously defined operation space (B),
whereby it is preferred when there is provided a base station (10) on said operation path (A) and/or operation space (B), or in the proximity thereof. Said base station (10) is adapted so that can provide charging of said energy storage means (14, 16).

This type of disposition provides advantages in terms of operation efficiency and reliability, adjusted to the needs of distribution of edible products in different types of situations.

Figure 7:
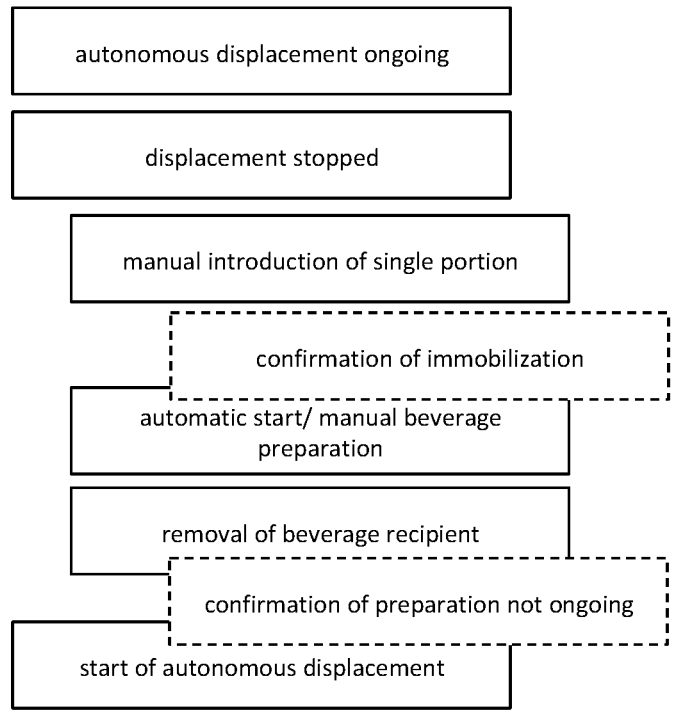
FIG. 7: flux diagram of a first embodiment of a process of operation of an apparatus (1) according to the present invention.

According to another inventive aspect (see FIG. 7), a process of operation further includes for each displacement of the semiautonomous apparatus (1):
  previous confirmation by a control device (8) that a cycle of preparation of edible product is not on-going, for example that energy is not being supplied to said subsystem of preparation of edible products;
  energy supply to said propulsion and locomotion means (5; 51, 52);
and, for each cycle of preparation of edible product, includes the steps:
  previous confirmation by a control device (8) that a displacement of said semiautonomous apparatus (1) is not on-going, for example that energy is not being supplied to said subsystem of propulsion and locomotion;
  insertion by the user of to be used portion (2) through a first opening (11);
  actuation by the user of said use interface (7), preferentially of a "start"-like command, so that the brewing device is actuated (4) and the supply of resulting edible product through a second opening (12) is concluded.

Figure 8:
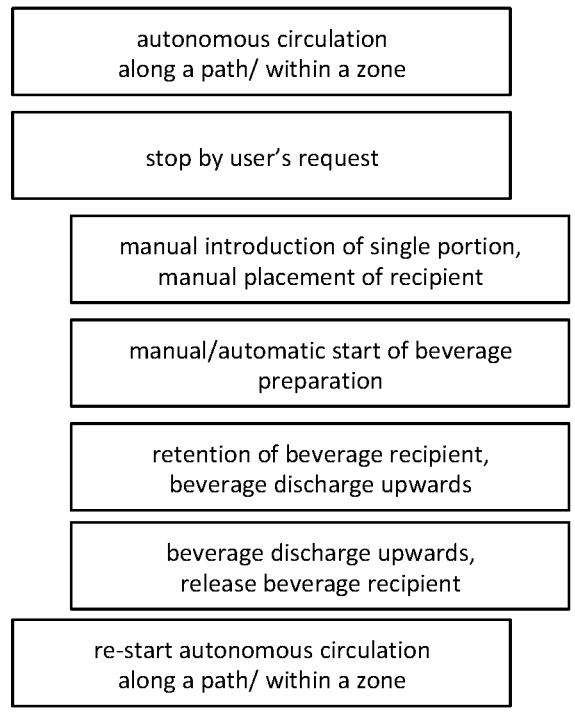
FIG. 8: flux diagram of a second embodiment of a process of operation of an apparatus (1) according to the present invention.

According to a preferred embodiment (see FIG. 8), stopping said semiautonomous apparatus (1) is attained upon user's request, including by recognition by said surroundings recognition means (6) of a previously defined user, or recognition of previously defined data.

It is further preferred when each cycle of preparation of edible product, in particular a beverage, requires manual placement of the beverage recipient on a respective beverage discharge (12) provided on said first service region (31), followed by an automatic retention of the beverage recipient on said beverage discharge (12), so that beverage discharge upwards through the base of said beverage recipient can be initiated thereafter. After conclusion of the beverage discharge, the mechanic retention of the beverage recipient can be automatically removed so that a user can remove it.

Lisbon, 12 Oct. 2018

The invention claimed is:

1. A semiautonomous apparatus (1) for preparation and distribution of edible products, including by means of using an individual portion (2) of an edible substance, and comprising:
   a casing (3) confining a brewing device (4) that can be provided in an open position where said brewing device (4) can collect said individual portion (2) of an edible substance, and in a closed position where a pressurized flow can be injected upon said individual portion (2) of an edible substance,
   autonomous propulsion and locomotion means (5) associated with said casing (3) and provided in operational connection with surroundings recognition means (6),
   a use interface (7) provided in operational connection with said autonomous propulsion and locomotion means (5),
   a control device (8) provided in operational connection with said brewing device (4) and with said autonomous propulsion and locomotion means (5), and
   a fluid supply disposition (9), comprising a fluid heating and pressurization means,
   wherein said casing (3) has a top region comprising a plurality of service regions (31, 32) that are adjacent and define a continuous surface without presenting any structures above said continuous surface, whereby said service regions (31, 32) include:
   a first service region (31) adapted for preparing a beverage and that comprises at least one first opening (11) configured to provide for the manual introduction of said individual portion (2) of an edible substance to said brewing device (4), and at least a second opening (12) serving as a product discharge and configured to discharge a beverage along a vertical direction upwards, through a base region and inside of a beverage recipient, and
   a second service region (32) supporting said use interface (7),
   whereby said first opening (11) and said second opening (12) are provided on a continuous plane.

2. A semiautonomous apparatus (1) for preparation and distribution of edible products, including by means of using an individual portion (2) of an edible substance, and comprising:
   a casing (3) confining a brewing device (4) that can be provided in an open position where said brewing device (4) can collect said individual portion (2) of an edible substance, and in a closed position where a pressurized flow can be injected upon said individual portion (2) of an edible substance,
   autonomous propulsion and locomotion means (5) associated with said casing (3) and provided in operational connection with surroundings recognition means (6),
   a use interface (7) provided in operational connection with said autonomous propulsion and locomotion means (5),
   a control device (8) provided in operational connection with said brewing device (4) and with said autonomous propulsion and locomotion means (5), and
   a fluid supply disposition (9), comprising a fluid heating and pressurization means,
   wherein said casing (3) has a top region comprising a plurality of service regions (31, 32) that are adjacent and define a continuous surface without presenting any structures above said continuous surface, whereby said service regions (31, 32) include:
   a first service region (31) adapted for preparing a beverage and that comprises at least one first opening (11) configured to provide for the manual introduction of said individual portion (2) of an edible substance to said brewing device (4), and at least a second opening (12) serving as a product discharge and configured to discharge a beverage along a vertical direction upwards, through a base region and inside of a beverage recipient, and
   a second service region (32) supporting said use interface (7),
   whereby said first opening (11) and said second opening (12) are provided on a continuous plane,
   wherein said casing (3) presents a generally parallelepiped shape, configuring a top region presenting no other openings or projections along an entire width and an entire length at a highest level of said casing (3), and
   wherein said casing (3) further presents a third service region (33),
   whereby said second (32), first (31) and third (33) service regions develop successively along the longitudinal extension of the top region of said casing (3).

3. The semiautonomous apparatus according to claim 2, wherein said casing (3) further presents a fourth service region (34) adapted for storage of said individual portions (2) of an edible substance,
   whereby said fourth service region (34) is provided as at least one of: as a region in the top surface of said casing (3) and as an interior space, with lateral or frontal access through said casing (3).

4. The semiautonomous apparatus according to claim 1, wherein said autonomous propulsion and locomotion means (5) comprise propulsion devices (51), and further comprise locomotion elements (52),
   whereby at least part of said locomotion elements (52) is directly associated to a respective propulsion device (51).

5. The semiautonomous apparatus according to claim 1, wherein said autonomous propulsion and locomotion means (5; 51, 52) comprise at least one of:
   two driving wheels adapted so as to propel locomotion of at least two other wheels; and
   two omnidirectional wheels, so that said apparatus can rotate around itself at a same location and invert the travelling direction or change the traveling direction, without having to make curved trajectories.

6. The semiautonomous apparatus according to claim 1, further comprising energy storage means (14, 16), a collection container for used individual portions (2) of an edible substance, and a fluid supply container (15),
   wherein said autonomous propulsion and locomotion means (5; 51, 52) are adapted to be supplied with energy from said energy storage means (14, 16),
   whereby said energy storage means (14, 16) are provided in at least one of:
   between and underneath said collection container (13) for used portions and said fluid supply container (15), so that said energy storage means (14, 16) can be accessed through a lateral region of said casing (3), provided on said casing (3).

7. A semiautonomous apparatus (1) for preparation and distribution of edible products, including by means of using an individual portion (2) of an edible substance, and comprising:
- a casing (3) confining a brewing device (4) that can be provided in an open position where said brewing device (4) can collect said individual portion (2) of an edible substance, and in a closed position where a pressurized flow can be injected upon said individual portion (2) of an edible substance,
- autonomous propulsion and locomotion means (5) associated with said casing (3) and provided in operational connection with surroundings recognition means (6), a use interface (7) provided in operational connection with said autonomous propulsion and locomotion means (5),
- a control device (8) provided in operational connection with said brewing device (4) and with said autonomous propulsion and locomotion means (5), and
- a fluid supply disposition (9), comprising a fluid heating and pressurization means,
- wherein said casing (3) has a top region comprising a plurality of service regions (31, 32) that are adjacent and define a continuous surface without presenting any structures above said continuous surface, whereby said service regions (31, 32) include:
- a first service region (31) adapted for preparing a beverage and that comprises at least one first opening (11) configured to provide for the manual introduction of said individual portion (2) of an edible substance to said brewing device (4), and at least a second opening (12) serving as a product discharge and configured to discharge a beverage along a vertical direction upwards, through a base region and inside of a beverage recipient, and
- a second service region (32) supporting said use interface (7),
- whereby said first opening (11) and said second opening (12) are provided on a continuous plane,
- wherein said apparatus further comprises first and second energy storage means (14, 16) configured to provide at least one of:
- non-simultaneous energy supply to consumers involved in the preparation of edible products and to said propulsion and locomotion means (5; 51, 52); and
- said first energy storage means (14) are adapted for supplying energy only to consumers involved in the preparation of edible products, and said second energy storage means (16) are adapted for supplying energy only to said propulsion and locomotion means (5; 51, 52), and
- wherein said casing (3) presents a generally parallelepiped shape, configuring a top region presenting no other openings or projections along an entire width and an entire length at a highest level of said casing (3), and
- wherein said casing (3) further presents a third service region (33),
- whereby said second (32), first (31) and third (33) service regions develop successively along the longitudinal extension of the top region of said casing (3).

8. The semiautonomous apparatus according to claim 7, wherein said first and second energy storage means (14, 16) are provided underneath and confined by said first and second service regions (31, 32).

9. The semiautonomous apparatus according to claim 2, wherein said casing (3) comprises a first module of casing (3) provided physically separated from, and physically connectable to, a second module of casing (3),
- whereby said first and second modules of casing (3) present a similar general configuration, and
- whereby said first and second service regions (31, 32) are provided on said first module of casing (3), and said third service region (33) is provided on said second module of casing (3).

10. The semiautonomous apparatus according to claim 4, wherein said casing (3) comprises a first module of casing (3) that comprises all the autonomous propulsion devices (51), whereby both said first and second modules of casing (3) present respective locomotion elements (52).

11. The semiautonomous apparatus according to claim 6, wherein said casing (3) comprises a first module of casing (3) that contains all said first energy storage means (14, 16), said fluid supply disposition (9), said fluid container (15), and said brewing device (4).

12. The semiautonomous apparatus according to claim 1,
- wherein said product discharge (12) is provided on said first service region (31), and adapted to discharge a flow of product along a generally vertical upwards direction, and
- wherein said fluid supply disposition (9) is arranged at a lower level with relation to said service regions (31, 32) and above of said autonomous propulsion and locomotion means (5; 51, 52).

13. A semiautonomous system for preparing and distributing edible products, and comprising:
- at least one a semi-autonomous apparatus (1) according to claim 1;
- at least one type of individual portion (2) containing an edible substance;
- whereby each of said semiautonomous apparatus (1) includes:
- a subsystem of preparation of edible products comprising fluid heating and pressurization means and at least one brewing device (4) that is provided in an open position where said brewing device (4) collects said individual portion (2) of an edible product, and in a closed position where a pressurized flow is injected upon said individual portion (2) of an edible product;
- a subsystem of autonomous locomotion comprising propulsion and locomotion means (5; 51, 52);
- at least one type of energy storage means (14, 16) adapted so as to provide energy to said subsystems of preparation of edible products and autonomous locomotion; and
- at least one control device (8) configured to control the operation of said subsystems of preparation of edible products, and the process of displacement including by means of supplying energy to said subsystems,
- wherein the energy consuming components associated with the subsystem for preparing edible products are provided at a level above the level of the energy consuming components associated with the subsystem of propulsion and locomotion.

14. The system according to claim 13,
- wherein at least one energy storage means (14) associated with said subsystem of preparation of edible products is provided at a level above at least one energy storage means (16) associated with said subsystem of propulsion and locomotion.

15. The system according to claim 13, wherein said control device (8) is configured to determine the circulation of said autonomous propulsion and locomotion means only according to at least one of:
- data relating to the non-operation of said subsystem of autonomous locomotion;
- data apprehended by surroundings reconnaissance means (6) relating to a user and to commands by a user; and
- data apprehended by surroundings reconnaissance means (6) relating to the circulation in an operating space that corresponds to at least one of: a closed circuit and a space with not previously defined limits.

16. The semiautonomous apparatus according to claim 9, wherein the similar general configuration is a parallelepiped shape.

17. The semiautonomous apparatus according to claim 12, whereby said product discharge (12) comprises means adapted for retaining a beverage recipient.

18. The semiautonomous apparatus according to claim 17, wherein said beverage recipient has a configuration adapted for said beverage recipient to be retained on said product discharge (12).

19. The semiautonomous system according to claim 13, comprising a plurality of semi-autonomous apparatuses (1) for preparation and distribution of edible products.

\* \* \* \* \*